(12) United States Patent
Cullen

(10) Patent No.: US 7,934,360 B2
(45) Date of Patent: May 3, 2011

(54) SYSTEMS FOR CONTROLLING PACKING DENSITY

(75) Inventor: Steven Cullen, Astoria, OR (US)

(73) Assignee: SRC Innovations, LLC, Chinook, WA (US)

( * ) Notice: Subject to any disclaimer, the term of this patent is extended or adjusted under 35 U.S.C. 154(b) by 0 days.

(21) Appl. No.: 12/060,347

(22) Filed: Apr. 1, 2008

(65) Prior Publication Data

US 2008/0178563 A1    Jul. 31, 2008

Related U.S. Application Data

(60) Division of application No. 11/676,481, filed on Feb. 19, 2007, now Pat. No. 7,404,280, which is a continuation-in-part of application No. 11/378,194, filed on Mar. 17, 2006, now Pat. No. 7,237,576, and a continuation-in-part of application No. 11/252,455, filed on Oct. 17, 2005, now Pat. No. 7,178,315, which is a continuation of application No. 10/867,593, filed on Jun. 14, 2004, now Pat. No. 6,955,030, which is a continuation-in-part of application No. 10/417,444, filed on Apr. 16, 2003, now Pat. No. 6,748,724.

(51) Int. Cl.
*B65B 1/24* (2006.01)
*B65B 9/15* (2006.01)
*B65B 63/02* (2006.01)

(52) U.S. Cl. ............... 53/527; 53/567; 53/576; 141/73; 141/114; 141/313

(58) Field of Classification Search ................. 53/527, 53/529, 530, 567, 576; 141/71, 73, 114, 141/313–319
See application file for complete search history.

(56) References Cited

U.S. PATENT DOCUMENTS

| | | | | |
|---|---|---|---|---|
| 4,611,642 A * | 9/1986 | Durhman | .................. | 141/114 |
| 5,661,956 A * | 9/1997 | Tardif | .................. | 53/588 |
| 6,202,389 B1 * | 3/2001 | Inman et al. | .................. | 141/313 |
| 6,748,724 B1 * | 6/2004 | Cullen | .................. | 53/527 |
| 6,955,030 B2 * | 10/2005 | Cullen | .................. | 53/527 |
| 7,178,315 B2 * | 2/2007 | Cullen | .................. | 53/527 |
| 7,237,576 B1 * | 7/2007 | Cullen | .................. | 141/71 |
| 7,404,280 B2 * | 7/2008 | Cullen | .................. | 53/527 |

* cited by examiner

*Primary Examiner* — Stephen F Gerrity
(74) *Attorney, Agent, or Firm* — RepuTrust, LLC

(57) ABSTRACT

Bagging machines may include a packing density measurement system. The packing density measurement system includes an anchor assembly and a force measurement assembly. The anchor assembly includes at least one drag member adapted to be operatively coupled to the bagging machine and to extend rearwardly beneath at least a portion of a bag to resist forward movement of the bagging machine. The force measurement assembly is operatively coupled to the anchor assembly and is adapted to measure the anchoring force applied to the bagging machine. The anchor assembly may be adjustable, either manually or automatically, to allow control over the anchoring force.

5 Claims, 5 Drawing Sheets

SYSTEMS FOR CONTROLLING PACKING DENSITY

CROSS-REFERENCE TO OTHER APPLICATIONS

This is a division of U.S. patent application Ser. No. 11/676,481 (the "'481 application"), filed on Feb. 19, 2007, entitled "Systems and Methods for Measuring Packing Density", now U.S. Pat. No. 7,404,280. The '481 application is a continuation-in-part application of U.S. patent application Ser. No. 11/378,194, filed on Mar. 17, 2006, entitled "Bagging Machines and Methods for Adjustably Controlling Packing Density", which issued as U.S. Pat. No. 7,237,576. The '481 application is also a continuation-in-part application of U.S. application Ser. No. 11/252,455 (the "'455 application"), filed on Oct. 17, 2005, entitled "An Adjustable Density Controller For A Bagging Machine", which issued as U.S. Pat. No. 7,178,315. The '455 application is a continuation application of U.S. patent application Ser. No. 10/867,593 (the "'593 application"), filed on Jun. 14, 2004, entitled "An Adjustable Density Controller For A Bagging Machine," which issued as U.S. Pat. No. 6,955,030. The '593 application is a continuation-in-part application of U.S. patent application Ser. No. 10/417,444, filed on Apr. 16, 2003, entitled "An Adjustable Density Control Means For A Bagging Machine," which issued as U.S. Pat. No. 6,748,724. The entire disclosures of these applications are incorporated herein by reference for all purposes.

FIELD OF THE INVENTION

This disclosure relates to bagging machines for measuring the packing density of material, such as silage, compost, or the like, packed into an elongate bag or container, and to bagging machines and methods for operating such bagging machines to adjustably control the packing density.

BACKGROUND

Agricultural feed bagging machines have been employed for several years to fill, pack, or bag silage or the like into elongate plastic bags. In these conventional bagging machines, silage or the like is supplied to the forward or intake end of the bagging machine and is fed to a rotor that conveys the silage into a tunnel on which the bag is positioned so that the bag is filled. As silage is loaded into the bag, the bagging machine moves away from the filled end of the bag due to the back pressure applied by the packed material against the machine. These machines included a pair of drums rotatably mounted on the bagging machine with a brake associated therewith for braking, or resisting, the rotation of the drum with a selected brake force. A cable or chain was wrapped around the drum and was released with rotation of the drum. A backstop structure was disposed at the closed end of the agricultural bag and was coupled to the bagging machine via the chains or cables to resist the movement of the bagging machine away from the filled end of the agricultural bag as silage was forced into the bag.

In more recent bagging machines, a density control means, which included a plurality of cables, was positioned in the flow of the silage material being bagged. In order to vary the density of the material in the machine, more or less cables would be employed based on the material being packed. For example, corn silage flows easily and would require more cables while alfalfa packs hard and would use less cables. Other arrangements are known in which the density of the material in the bag is controlled by a density control means positioned in the path of the material being bagged.

Control of the packing density during the bagging operation is important because a single bag may include material having different properties that packs differently. For example, a single bag may be several hundred feet long and may be packed with agricultural material, such as alfalfa, from all parts of a farm or region. The alfalfa is brought to the bagging machine in a number of separate loads, some of which may be wetter than others or some of which may include alfalfa cut longer than the alfalfa in other loads. The wet alfalfa or long alfalfa will pack more densely in a given bagging machine configuration than will dry or short alfalfa. Accordingly, a user may prefer to adjust the configuration of the density control apparatus in accordance with the material properties of the material being packed. Unfortunately, the extent and impact of the differences between the materials is rarely known until the material is packed into the bag and the packing density difference only evidences itself as loose packing or a bagging machine that is stuck due to the unexpectedly dense packing.

Previous bagging machines with adjustable density control apparatus allowed the user to control the packing density during operation based on their visual perception of the exterior of the bag and their sense for how hard the machine was working to pack additional material into the bag. Moreover, in many of the previous configurations, once a need to adjust the density control apparatus configuration was identified, it often took several feet of packing distance before the desired change was completed. For example, if the forward end of a cable loop is narrowed, the rearward end will trend narrower as it moves forward but it will not be as narrow as the forward end for at least several inches, if not several feet, of bagging machine movement.

Therefore, there are at least three areas where inaccuracy or delay can be introduced into the packing operation resulting in material being packed at a density other than the desired packing density. For example, the operator may be slow or inaccurate in observing changes in the packing density, the operator may be slow or inaccurate in executing the necessary commands or steps necessary to effect the change in the density control apparatus configuration, and/or the density control apparatus may introduce inherent delays between initiation of the configuration change and completion of the configuration change. Depending on the circumstances, that inaccuracy or delay may lead to undesirably loose packing for several inches or feet of the bag length or may cause the machine to become stalled due to the resistance force being greater than the available forward driving force. The loosely packed material wastes available storage space and may decrease the storage quality. A stalled machine interrupts the bagging operation and wastes many resources trying to free the machine from the packed bag and restarting the bagging operation. A bagging machine that provides for greater measurement of and control over the packing density is described herein.

SUMMARY

The present disclosure is directed to a density control system adapted for use in cooperation with a packing machine for packing material such as silage material, compost material, and the like into an elongate bag or container. The packing machine may be adapted to move forwardly with respect to a ground surface as it packs material into the container. The density control system may include a material-forming enclosure and at least one drag strap. The material-forming enclosure has an intake end configured to couple to a packing machine and configured to receive material to be packed. The material-forming enclosure additionally has an output end extending rearwardly away from the packing machine, which is also configured to receive a container. The at least one drag member may include a first and a second drag strap operatively coupled to the packing machine and configured to extend rearwardly beneath at least a portion of the container to resist forward movement of the packing machine. The at least one drag member may have at least an upper surface and a lower surface. At least a portion of the upper surface may be adapted to be disposed in frictional contact with at least one of a portion of the container and a portion of the packed material. The lower surface, or at least a portion thereof, may be adapted to be disposed in frictional contact with a ground surface over which the bagging machine moves as it packs material into the bag.

The present disclosure also relates to a method of packing agricultural, silage, or compost material into an elongate container. The method may comprise providing a packing machine adapted to move forwardly as material is packed into a container. The packing machine may include a movable frame having a rearward end and a forward end. The packing machine may also include a material-forming enclosure having an intake end coupled to the rearward end of the movable frame and adapted to receive the material being packed. The material-forming enclosure may also have an output end extending rearwardly from the movable frame and adapted to receive the container. The packing machine may also include a material-filling apparatus coupled to the movable frame and adapted to move the material into and through the material-forming enclosure. The material-filling apparatus may be adapted to pack the material into the container. The packing machine may further include at least one drag member operatively coupled to the packing machine and extending rearward with respect to the frame.

The method may begin by mounting a container to the packing machine, the container having an open mouth operatively coupled to the output end of the material-forming enclosure and having a lower region disposed adjacent to a ground surface. At least a portion of at least one drag member may be disposed between the ground surface and at least a portion of the lower region of the container such that at least a portion of the at least one drag member is in frictional contact with both the ground surface and the container. The packing machine and material-filling apparatus may then be operated to move material through the material-forming enclosure into the container to pack the container. During the packing operation, the at least one drag member disposed in frictional contact with the ground surface and the container is adapted to apply a resistance to forward movement of the packing machine to cause densification of the packed material in the container.

Still additionally, the present disclosure is directed to a bagging machine for bagging agricultural, compost, or other materials into an elongate bag for storage and/or composting. The elongate bag may be similar to conventional bags used in such applications or may be formed from an elongate sheet that is formed into a substantially cylindrical form to enclose the material being packed. The elongate bag, regardless of how it is formed may have an open end and a closed end. The bagging machines of this implementation may include a mobile frame having a forward end and a rearward end. Additionally, a material forming enclosure may be operatively coupled to the mobile frame adjacent the rearward end thereof and may extend rearwardly therefrom. The material forming enclosure may be adapted to receive an open end of an elongate bag. The bagging machine may also include a material packing apparatus adapted to move loose material into the material forming enclosure and into the elongate bag. The bagging machine is adapted to move forward as the loose material is packed into the bag against the closed end thereof. The bagging machine further includes a hopper adapted to receive loose material and to direct the loose material to the material packing apparatus. Additionally, the bagging machine may include a packing density measurement system. The packing density measurement system includes an anchor assembly and a force measurement assembly. The anchor assembly includes at least one drag member adapted to be operatively coupled to the bagging machine and to extend rearwardly beneath at least a portion of the bag to resist forward movement of the bagging machine. The force measurement assembly is operatively coupled to the anchor assembly and is adapted to measure the anchoring force applied to the bagging machine.

The present disclosure is also directed to a method of controlling the packing density of agricultural, compost, or other loose materials being packed into an elongate bag for storage and/or composting. In one such method according to the present disclosure, the material is packed by a bagging machine coupled to an elongate bag extending rearwardly from a material forming enclosure of the bagging machine to a closed end of the bag. The bagging machine is adapted to move forward as loose material is packed into the bag. The method of controlling the packing density may include operatively coupling an anchor assembly to the bagging machine. The anchor assembly may include at least one drag member that extends rearwardly beneath at least a portion of a bag to frictionally engage at least a portion of the bag and a ground surface over which the bagging machine moves during operation. The at least one drag member may have a fixed member length and an adjustable extended length. The method may additionally include operating the bagging machine to pack loose material into the material forming enclosure and into the elongate bag. The frictional engagement of the at least one drag member with the ground surface and the portion of the bag may apply an anchoring force to the bagging machine against the forward movement thereof. During the bagging operation, the method may include measuring the anchoring force applied to the bagging machine by the at least one drag member. The present methods additionally include determining a target anchoring force, which may be done either before or during the bagging operation. In some aspects of the present disclosure the methods of controlling the packing density may include selectively adjusting the extended length of at least one drag member to maintain the measured anchoring force within a predetermined range of the target anchoring force.

DETAILED DESCRIPTION

Figure 1:
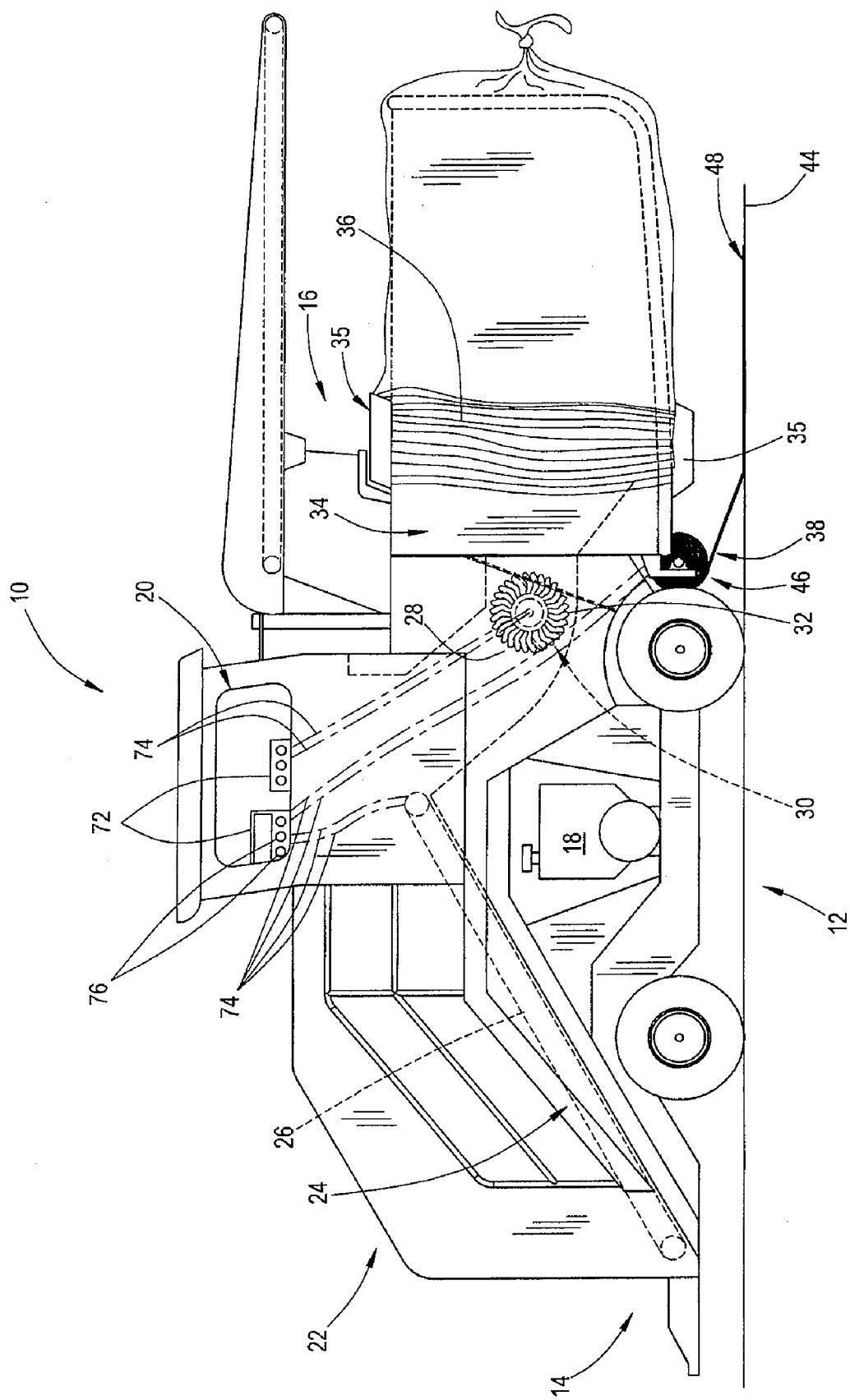
FIG. 1 is a side view of a packing machine having an anchor assembly coupled thereto.

In FIG. 1, a bagging machine is identified generally with the numeral 10. Bagging machine 10 may be configured for use with a conventional pre-folded bag, a bag that is folded as it is installed on the bagging machine such as described in U.S. patent application Ser. No. 10/350,973, now abandoned and published on Jul. 29, 2004 as U.S. Patent Publication No. 2004-0144067, or a bag that is formed from a roll of plastic material disposed on the bagging machine such as described in U.S. patent application Ser. No. 10/334,484, now abandoned and published on Jul. 8, 2004 as U.S. Patent Publication No. 2004-0128953 A1. The entire disclosures of the above-mentioned published and abandoned patent applications are incorporated herein by reference for all purposes.

Machine 10 is illustrated as including a mobile frame 12. Mobile frame 12 may include wheels to facilitate movement and control and may also include an engine 18, an operator's cab 20, and other associated component parts. In some configurations, one or more of the illustrated components may be omitted or replaced. For example, the engine and/or operator's cab may be omitted and the mobile frame may be provided with a hitch to be pulled by a tractor or other equipment. Additionally or alternatively, the wheels and/or hitch may be omitted. Additionally, bagging machine 10 and associated frame 12 may be truck-mounted, such as seen in U.S. Pat. No. 5,784,865, or may be self-propelled, such as illustrated in U.S. Pat. No. 5,799,472. The complete disclosures of both of these patents are incorporated herein by reference for all purposes. The mobile frame 12 of the bagging machine 10 may include a number of suitable component parts to facilitate the operation of the bagging machine under a variety of conditions.

For purposes of description, bagging machine 10 will be described as having a forward end 14 and a rearward end 16. Machine 10 is provided with a material-receiving assembly 22 at its forward end which may be in the form of: (1) a feed table such as seen in U.S. Pat. No. 5,297,377; (2) a hopper such as seen in U.S. Pat. No. 5,398,736; (3) a feed mechanism such as shown in U.S. Pat. No. 5,396,753; (4) a feed mechanism such as shown in U.S. Pat. No. 5,367,860; (5) a hopper such as seen in U.S. Pat. Nos. 5,140,802; 5,419,102; and 5,724,793; (6) a combination of one or more of the above; and/or (7) other suitable material receiving assemblies. The complete disclosures of the above-mentioned patents are incorporated herein by reference for all purposes. In the illustrated configuration, the material-receiving assembly 22 includes a material transport system 24 in the form of a conveyer belt 26 and a hopper 28. The material transport system 24 and the hopper 28 are adapted to move and direct the loose material to a material-packing assembly 30, which may be positioned towards the rearward end of the mobile frame 12.

Material-packing assembly 30 may include: (1) a rotor 32 such as illustrated in FIG. 1 and as shown and described in greater detail in U.S. Pat. Nos. 5,396,753; 5,297,377; 5,799,472; or 5,295,554; (2) a screw conveyor such as shown and described in U.S. Pat. Nos. 5,140,802 or 5,419,102; (3) a plunger such as shown and described in U.S. Pat. No. 5,724,793; (4) the packing fingers shown and described in U.S. Pat. No. 3,687,061; (5) a combination of one or more of the above; and/or (6) other suitable packing assemblies. The complete disclosures of the above-mentioned patents are incorporated herein by reference for all purposes.

With continuing reference to FIG. 1, the bagging machine 10 may include a material-forming enclosure 34 coupled to the rearward end of the mobile frame 12. The material-forming enclosure 34 may also be referred to herein as a tunnel. The material-forming enclosure 34 may be semi-circular, as shown in FIG. 1, or it may be square, rectangular, circular, oblong, or other suitable configurations. The tunnel 34 may be open at the bottom, as shown in FIG. 1, or may be at least partially closed at the bottom. As used herein, the term "tunnel" should be understood to signify a horizontal passageway at least partially open at both the forward end thereof and the rearward end thereof. The size of the tunnel, measured by either longitudinal length or cross-sectional area, at any particular time may be dependent on a number of factors including the diameter of the bag being filled, the type of material being bagged, the configuration of the tunnel such as semi-circular or circular, and whether bagging machine 10 is configured to be transported on a highway where machine width is a limiting factor. Various suitable tunnels and aspects of suitable tunnels are shown in U.S. Pat. Nos. 5,899,247; 5,396,753; 5,297,377; 5,799,472; 5,398,736; 5,355,659; 5,295,554; 5,140,802; 5,419,102; 5,421,142; 5,724,793; 5,894,713; and the other patents referenced above, the entire disclosures of which are incorporated herein by reference for all purposes. Material-forming enclosure 34 may be adapted to cooperate with a bag or other container (not shown) into which the material-packing assembly 30 packs the material. Material-forming enclosure 34 may include a number of components to facilitate or otherwise aid the cooperation between the bag and material-forming enclosure 34. For example, material-forming enclosure 34 may include one or more bag retainers 35 adapted to retain the bag on the material-forming enclosure and gradually release the bag as needed.

With reference to FIGS. 1, 2, 4, and 5, the numeral 36 refers to a flexible bag or container into which material is filled, bagged or packed. As used herein, the terms "packing" and "bagging" are used interchangeably and should be understood to refer to the act placing a quantity of material into a bag or other container. The container used in cooperation with the bagging machine described herein may be a conventional bag with an opening having a continuous circumference or it may be a flexible container formed by an elongate covering having opposing side edges. When a flexible, elongate covering is used to form the container, the container may extend partially around or completely around the material being packed to partially or completely enclose the same. The flexible, elongate covering may be formed into a cylindrical or semi-cylindrical shape by tucking the opposing side edges under the packed material. An example of a flexible container partially enclosing the packed material is described in U.S. patent application Ser. No. 10/334,484, now abandoned and published on Jul. 8, 2004 as U.S. Patent Publication No. 2004-0128953 A1, the disclosure of which is incorporated herein by reference. The flexible container may be configured such that the opposing side edges adjacent the material-forming enclosure are tucked between the packed material and the drag member described herein. The flexible container may also be configured such that the opposing side edges remain tucked under the packed material as the packing machine moves away from the closed end of the flexible container. When one or more drag members are utilized, such as described herein, at least a lower portion of the container may be disposed between the packed material and the one or more drag members.

The bagging machine 10 may be adapted to pack a variety of materials. For example, packing machine 10 may be adapted to bag compost material or agricultural material into bags or containers for storage and/or composting. As material-packing assembly 30 moves material into the bag, the bag fills and the material is pressed or compressed within the bag. The loose material becomes packed material in the material-forming enclosure 34. As additional material is packed into the bag, the back pressure from the packed material will move the bagging machine 10 forward. As the bagging machine 10 moves forward, additional bag material will be released as needed to provide additional room for the material. Accordingly, material-packing assembly 30 may be adapted to move the bagging machine forward.

An anchor assembly 38 is operatively coupled to bagging machine 10, such as to mobile frame 12, and is disposed in operative association with the packed material 40 (seen in FIG. 2) in the material-forming enclosure 34 and/or the bag 36 to provide resistance to the forward movement of the bagging machine. The amount of resistance provided by anchor assembly 38 cooperates with material-packing assembly 30 to control the rate at which bagging machine 10 moves away from the closed end of the bag.

The anchor assembly 38 may include at least one drag member 42 as shown in FIG. 1. The drag member 42 may be configured to be operatively coupled to packing machine 10. When coupled to machine 10, the drag member 42 may be configured to extend rearwardly with respect to the frame, between the bag 36, or the material being packed 40, and the ground surface 44. For ease of discussion, the at least one drag member 42 may be described as having a coupling end 46 operatively mounted to machine 10 and a free end 48 extending rearwardly with respect to frame 12.

The at least one drag member 42 may be constructed of a heavy-duty conveyor belt material such as used in conveying particulate material such as aggregate, sand, etc. Alternatively, the drag member 42 may be constructed of rubber, plastic, woven material, non-woven material or other material suitable for the purposes described herein. The at least one drag member 42 may be of any thickness; however, convenience and weight considerations may favor a thinner construction. Additional features of the drag member(s) 42 are discussed below.

In some embodiments, the at least one drag member 42 may be considered to have a fixed member length and an adjustable extended length. In these embodiments, the density control system of the present disclosure becomes an adjustable density control system. The extended length of drag member 42 may be understood to mean the length of drag member 42 disposed between the packed material and the ground surface. The extended length may be adjusted through the use of a variety of devices and mechanisms, including manually adjustable systems and mechanically adjustable systems. As one example of a manually adjustable system, the drag member 42 may be configured to couple to machine 10 via chains between the machine 10 and the drag member 42. The extended length of drag member 42 may be adjusted by coupling the chains to different locations on drag member 42, by coupling the chains to different locations on machine 10, or by changing the length of the chain between machine 10 and drag member 42.

Figure 2:
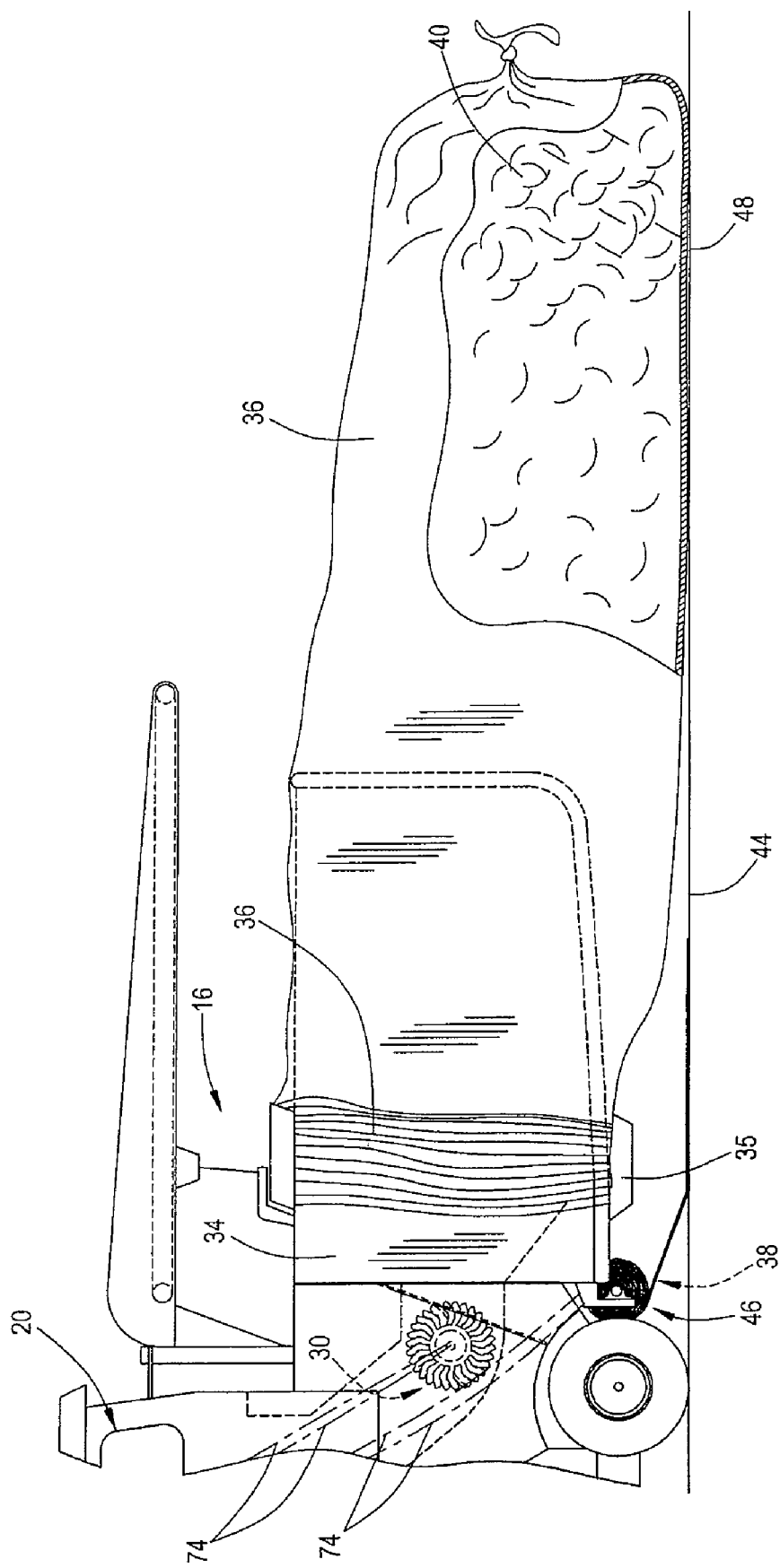
FIG. 2 is a side view illustrating an anchor assembly being used.
Figure 3:
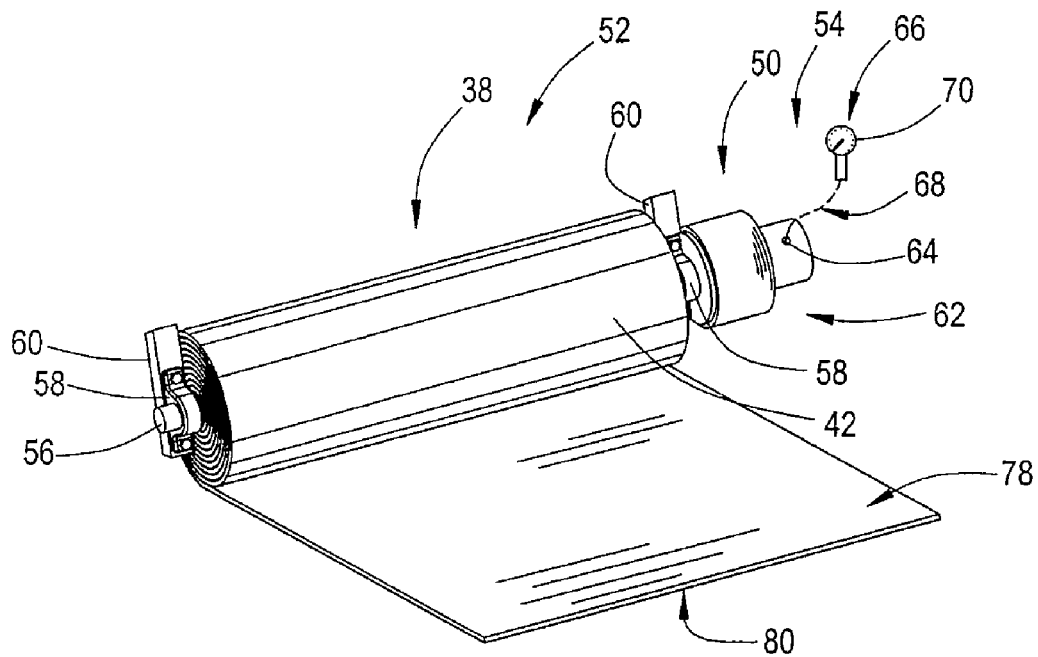
FIG. 3 is a rear perspective view of an embodiment of an anchor assembly configured to be coupled to the bagging machine.

Additionally or alternatively, bagging machines and methods according to the present disclosure may include one or more adjustment assemblies adapted to facilitate the adjustment of the extended length of the at least one drag member 42 through the use of mechanical adjustment systems. In one illustrative implementation, an anchor assembly 38 is illustrated in FIGS. 1-5 including a drag member 42 coupled to a rotatable winch 50, which is best shown in FIG. 3. The winch 50 is one example of a mechanical adjustment system. Other implementations may include one or more driven members, such as hydraulically or mechanically driven members, adapted to adjust the extended length of the drag members. For example, a combination of telescoping members may be implemented along with hydraulics to effect adjustment of the position of the drag member relative to the mobile frame 12.

When the anchor assembly 38 is configured to include a mechanically variable adjustment assembly, the anchor assembly may also be utilized to assist in moving a folded bag 36 forwardly onto the material-forming enclosure or tunnel 34; For example, the winch 50 or other driven members of the anchor assembly 38 may be operated to unroll drag member 42 so that the rearward free end 48 thereof is positioned rearward of the rearward end of the material-forming enclosure 34. The upper portion of the bag 36 may then be positioned on material-forming enclosure 34 with the lower portion thereof resting on the drag member 42 adjacent the rearward free end 48. The winch 50 or other driven member then may be reversed or operated so that drag member 42 is moved forwardly, such as by being wound upon the winch 50, which causes the lower portion of the folded bag 36 to be moved forwardly until such time as the bag may be lifted upwardly so that the bag retainers 35 will support the lower portion of the folded bag 36, as illustrated in FIG. 1.

Figure 4:
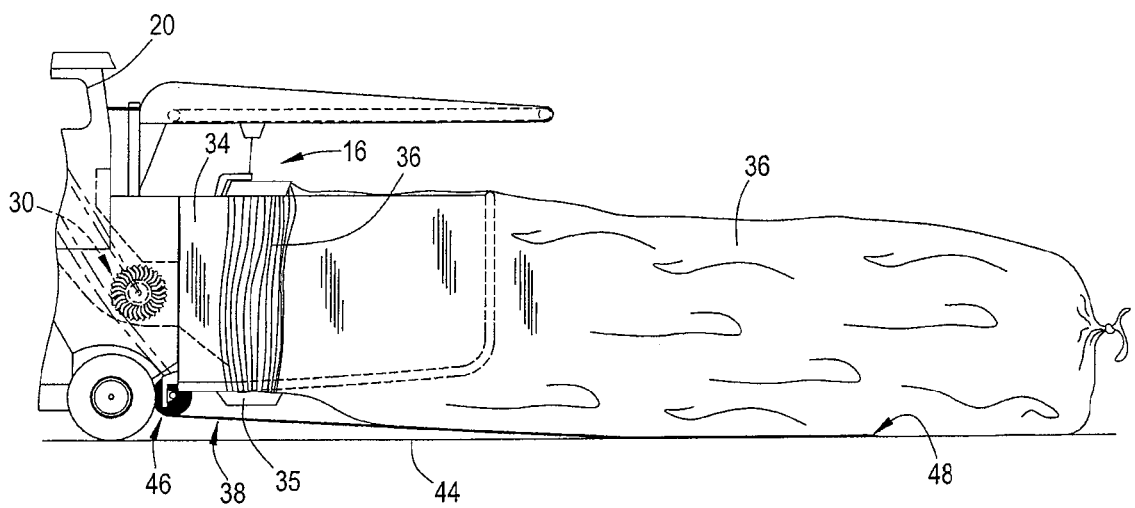
FIG. 4 is a side view illustrating an anchor assembly being positioned beneath the bag being filled.

When it is desired to fill, pack, or bag material into the bag or container 36 on machine 10, the rearward end thereof is closed, such as illustrated in FIG. 1. The anchor assembly 38 may be adjusted or configured so that the free end 48 of the drag member 42 is positioned rearwardly of the rearward end of the material-forming enclosure or tunnel 34 with bag 36 resting thereupon, as shown in FIGS. 2 and 4. Additionally or alternatively, in some configurations and implementations of the present machines and methods, the extended length of the drag member 42 may not extend beyond the rearward end of the tunnel 34 but may still be in operative engagement between the bag 36, the packed material 40, and the ground surface 44 to provide an anchoring force on the bagging machine 10.

As material is forced into bag 36 by means of the material packing assembly 30, the machine 10 will move forwardly with respect to the closed end of the bag. The weight of bag 36 and/or the material therein resting on drag member 42 will provide resistance to the forward movement of machine 10 away from the filled bag 36. The density of the material may be adjustably controlled by varying the amount of the drag member 42 which is under pressure between packed material 40 and ground surface 44. For example, if greater density is desired, a greater amount of the drag member 42 will be positioned beneath the bag. Without being bound by theory, it is presently believed that the packing density is at least partially dependent of the amount of friction between drag member 42 and ground surface 44. Accordingly, the packing density may be varied by changing the extended length of drag member 42 as discussed above, by changing the width of drag member 42, or by changing characteristics of the ground surface 44 or the drag member 42 to adjust the coefficient of friction therebetween.

Figure 5:
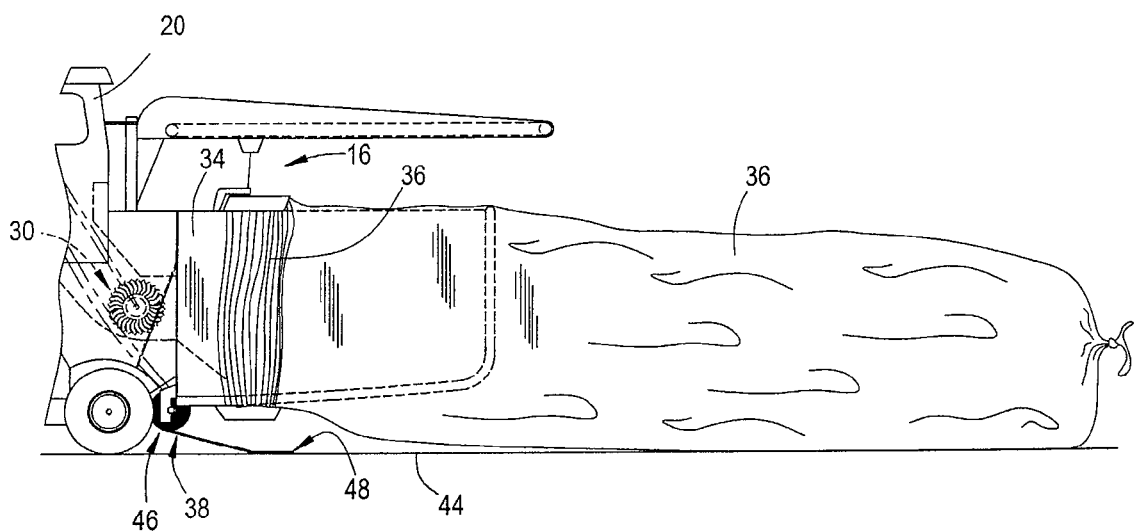
FIG. 5 is a view similar to FIG. 4 but which illustrates the anchor assembly being removed from beneath the bag.

FIGS. 2, 4, and 5 provide illustrations of one embodiment of an anchor assembly 38 in different phases of operation. FIG. 2 shows the packing or bagging machine 10 soon after beginning operations. As can be seen, the drag member 42 extends rearwardly from packing machine 10 between the material being packed 40 and the ground surface 44. As shown here, a lower portion of the bag or container 36 is disposed between packed material 40 and drag member 42.

FIG. 4 shows packing machine 10 at a subsequent time during the operation of the machine. As can be seen, movable frame 12 moves away from the closed end of bag 36 pulling drag member 42 under bag 36 and packed material 40. The rate at which the bagging machine moves away from the closed end of the bag may be dependent on a number of factors, such as the rate at which loose material is provided to the bagging machine, the rate at which and the force with which the material packing assembly packs material into the bag, and the anchoring force applied by the anchor assembly. Any one or more of these factors may be varied by the operator of the bagging machine.

FIG. 5 shows the operation of packing machine 10 when the packing operation is concluded. When the bag 36 has been completely filled or filled to the desired capacity, the material packing assembly 30 is inactivated and the drag member 42 is pulled from beneath the packed bag. In bagging machines implementing an anchor assembly 38 including a mechanically adjustable drag member, such as winch 50, the winch 50 may be activated to pull the drag member 42 from beneath the bag. Additionally or alternatively, the bagging machine 10 may be adapted to pull the drag member from beneath the bag by engaging its own power sources to move the bagging machine forward. For example, with a manually adjustable anchor assembly, the bagging machine may simply move forward under its own power (i.e., without reliance on the packing operation to produce the forward movement) to pull the drag member from under the bag. As described above, bagging machines may be provided in a variety of configurations, including truck-mounted, trailer-pulled, and self-propelled. Accordingly, the bagging machine may be caused to move forward without reliance on the driving force of the packing operation in any suitable manner. Similarly, the bagging machine 10 and/or the anchor assembly 38 may be adapted to pull the drag member 42 from beneath the bag or packed material prior to completing the bagging operations. For example, when the resistance to forward movement inadvertently becomes so great that packing machine 10 is unable to move forward based solely on the driving force of the packing operation, the machine 10 and/or the length adjustment assembly of the anchor assembly 38 may be engaged to reduce the operative extended length of the drag member 42 that is disposed between the packed material and the ground surface 44.

Bagging machines and methods within the scope of the present disclosure may be adapted to measure the packing density of the material packed into the bag. By measuring the packing density and reporting the same to an operator, the operator of the bagging machine may be able to make various adjustments in the operation of the bagging machine to attain and/or maintain the desired packing density. In bagging machines so adapted to measure the packing density, a packing density measurement system 52 including an anchor assembly 38 and a force measurement assembly 54 may be provided. An exemplary packing density measurement system 52 is illustrated schematically in FIG. 3.

In the exemplary packing density measurement system 52 shown in FIG. 3, an exemplary anchor assembly 38 including a winch 50 is illustrated separate from the bagging machine in which it may be used. While a winch 50 may be incorporated into a bagging machine 10 in a variety of manners, FIG. 3 and the discussion thereof illustrates one implementation that is suitable for coupling a winch to the bagging machine 10 and to the drag member 42 of the anchor assembly 38. As illustrated, a rotatable member such as a winch shaft 56 has its ends rotatably mounted in bearings 58 which are secured to support members 60. A drive assembly 62 is provided for selectively rotating the shaft 56 in either a clockwise or counterclockwise direction. The drive assembly 62 may include any suitable components, such as a hydraulic motor and a planetary gear drive mechanism of conventional design.

FIG. 3 further illustrates that the anchor assembly 38 may be combined with a force measurement assembly 54 to form a packing density measurement system 52. The force measurement assembly 54 may be adapted to be operatively coupled to the anchor assembly to measure the anchoring force applied to the bagging machine during the bagging operations. The force measurement assembly 54 may include a measuring device 64 disposed in communication with the anchor assembly 38, which may be adapted to measure hydraulic pressure or other forces that may be associated with the anchoring force applied by the anchor assembly. For example, when the anchor assembly 38 includes a drag member 42 wrapped around a winch 50 with a hydraulic motor adapted to wind up and/or unwind the drag member, the measuring device 64 may be adapted to measure the hydraulic pressure in the hydraulic motor to determine the amount of force required to prevent the drag member from unwinding (i.e., to maintain the desired extended length of the drag member). When the anchor assembly 38 includes alternative drive assemblies for adjusting the extended length of the drag member 42, alternative measuring devices 64 may be used. One example of a suitable measuring device that may be implemented according to the present disclosure is a weigh bar coupled with one or more elements of the anchor assembly 38. As one exemplary implementation, when the anchor assembly does not include a mechanical adjustment feature, such as when the extended length is adjusted by manually varying the length of chains or other coupling members used to couple the drag member to the frame, the measuring device 64 may be a weigh bar or other assembly adapted to measure the anchoring force applied by the drag member.

The selection of an appropriate measuring device 64 may depend on the configuration of the anchor assembly 38. Similarly, the method of coupling the measuring device to the anchor assembly 38 and/or other elements of the bagging machine 10 may depend on the configuration of the anchor assembly. The method of coupling a hydraulic measuring device 64 to a winch 50 that is operatively coupled to both the bagging machine 10 and the anchor assembly 38 is shown in FIG. 3 and discussed herein. A method of coupling a weigh bar between an anchor assembly and a bagging machine is illustrated and described in previously incorporated U.S. Pat. No. 7,237,576. Couplings analogous to either or both of these exemplary couplings may be incorporated into bagging machines according to the present disclosure.

To illustrate an exemplary method of measuring the anchoring force applied to the bagging machine, one suitable scenario will be described with reference to the anchor assembly 38 including a motorized winch 50, such as shown in FIGS. 1-5. As described earlier in connection with FIG. 3, the anchor assembly 38 may include a rotatable winch shaft 56 and a drive assembly 62 adapted to rotate the winch shaft

56. The drive assembly 62, when provided, is configured to unroll the drag member 42 when a greater extended length is desired and to roll up the drag member 42 when a shorter extended length is desired, but it also is configured to keep the drag member 42 from unrolling involuntarily. A back pressure will be exerted on drive assembly 62 by drag member 42 as it is being pulled under bag 36 or packed material 40 during the bagging operations. For purposes of this example, the drive assembly 62 includes a hydraulic motor. As discussed above, a force measurement system 54 may be in operative communication with the anchor assembly. The force measurement system 54 includes a measuring device 64, such as suitable sensors, operatively and fluidly coupled to the hydraulic motor to provide an operator with a measurement of the amount of back pressure exerted on hydraulic motor. This measurement can be utilized to determine the packing density achieved for the material being packed. Similar gauges and measurements can be implemented for different types of drive assemblies 62 and different configurations of anchor assemblies 38.

Suitable measuring devices 64 that may be incorporated into bagging machines according to the present disclosure may include sensors, circuits, converters, or other components or systems adapted to convert a change in a characteristic of the anchor assembly into a measured force. The measuring devices 64 may determine the measured force through purely mechanical means or may include circuits to convert a mechanical measurement into a digital signal representative of the anchoring forces applied to the bagging machine.

Regardless of the methods and means used to measure the anchoring force applied to the bagging machine by the anchoring assembly, the measured force may be communicated to a user via an output device 66 in communication with the measuring device 64 via a communication link 68. In one exemplary and elementary implementation, the output device 66 may include a simple gauge 70 disposed adjacent to the anchor assembly 38, as schematically illustrated in FIG. 3. Additionally or alternatively, the output device 66 may include one or more visual displays 72, such as illustrated in FIG. 1, that may be disposed in the operator's cab 20 or other suitable location on the bagging machine 10, which may display data regarding the bagging operations in digital or analog formats using electrical or mechanical displays. In some implementations of the present disclosure, the measured anchoring force may be communicated to an operator remote from the bagging machine, such as via one or more wireless communication technologies.

The output device 66 may communicate a variety of data to the operator, including data from the anchor assembly 38, the packing density measurement system 52, and other components of the bagging machine 10, such as the material-receiving assembly 22 and the material packing assembly 30. In some configurations, the output device 68 may communicate the measured change in some characteristic of the anchor assembly, such as the change in pressure within a hydraulic motor or the deformation of a weigh bar. Additionally or alternatively, the packing density measurement system 52, such as one or more of the measuring device 64 and the output device 66, may be adapted to correlate the measured change to a measurement of the anchoring force applied by the anchoring assembly. In such configurations, the measured anchoring force may be communicated the operator via the output device 66, alone or together with the raw measurement data.

While the measured changes in the anchor assembly 38 and the measured anchoring forces are relevant to the bagging operation, they may not directly communicate the packing density of the packed material to the machine operator. As discussed above, the operator may be principally concerned with maintaining the packing density of the packed materials within a predetermined range. Packing density measurement systems 52 according to the present disclosure may be adapted to communicate the packing density to the operator through automated or manual correlation of the measured anchoring force (or measured anchor assembly change) to a correlated packing density.

Depending on the diversity of bagging operations a machine is intended to perform, the correlation may be the same for all bagging operations or may vary between operations. For example, a bagging machine intended to bag similar materials under similar conditions throughout its useful life may be provided with a single correlation table, either displayed adjacent to the output device 66 for quick reference by the operator or embedded in the packing density measurement system 52 such that the output device 66 displays information communicating the packing density directly to the operator. Additionally or alternatively, a bagging machine may be provided with more than one correlation table with each correlation table being suitable for one or more sets of bagging conditions. For example, a correlation table for bagging wet alfalfa and a correlation table for bagging dry alfalfa may be disposed adjacent the output device 66 to allow the operator to selectively reference the appropriate table depending on the conditions of the bagging operation. As an additional or alternative example, the packing density measurement system may be adapted to allow the user to select, such as through a plurality of push buttons, dial settings, or electronic means, the bagging conditions of the bagging operations to indicate to the packing density measurement system 52 which correlation table or settings to use in calculating the packing density from the measured change in the anchor assembly and/or the measured anchoring force. While electronics, computers, and similar components may be used to calculate the packing density, the packing density measurement system 52 may be adapted to simply display the measured change in the anchor assembly characteristic and/or the measured anchoring force and allow the operator to correlate this information to the packing density based on his experience and intuition.

As discussed, the output device 66 may be disposed in any suitable location on the bagging machine 10, such as in or adjacent the operator's cab 20 or other location from which the operator controls one or more aspects of the bagging machine. Accordingly, an operator of a bagging machine equipped with a packing density measurement system according to the present disclosure may be able to exert improved control over the packing density of the material in the bag due the additional information about the bagging operation. Specifically, the force measurement system 54 and the output device 66 provide the operator with information regarding what is occurring within the packed bag in addition to his ability to monitor conditions outside the bag. The operator may adjust the operation of the bagging machine in response to the measured change in the anchor assembly characteristic, the measured anchoring force, and/or the correlated packing density. For example, the operator may increase or decrease the rate at which loose material is fed to the bagging machine, may alter what is being fed to the bagging machine (such as by changing the moisture content or the particle size of the loose material), and/or may alter the operation of the material packing assembly 30. Additionally or alternatively, the operator may adjust the configuration of the anchor assembly to control the packing density.

As illustrated in FIG. 1, the visual display 72 disposed in the operator's cab 20 may include multiple display screens and multiple control interfaces 76. Additionally, the visual display 72 may be in communication with multiple components of the bagging machine as illustrated schematically by communication lines 74 in FIG. 1. The communication between the visual display 72 and the elements of the bagging machine 10 may provide one-way and/or two-way communication depending on the preferred configuration of the operator. For example, the visual display 72 may be in communication with the material transport system 24, the material packing assembly 30, and/or the anchor assembly 38.

The communication lines 74 between the various components and the visual display 72 may provide the operator with basic information about the bagging machine 10, such as the rate at which the conveyer belt is moving, the rate at which the rotor of the material packing assembly is rotating, or other such information. Additionally, the communication lines 74 may enable the operator to control the operation of one or more of these elements. For example, the operator may cause the material transport system 24 to move material into the packing assembly 30 at a faster or slower rate and may cause the packing assembly 30 to turn with greater force and/or speed.

Additionally or alternatively, the elements of the bagging machine and the communication lines 74 may be adapted to provide more advanced information about the operation of the bagging machines. For example, in the context of the material transport system 24, the transport system 24 may be adapted to include one or more sensors to measure the weight and/or volume of material moving through the material transport system. Accordingly, the operator would be provided with information about the volumetric feed rate of material into the material packing assembly 30. With such additional information about the bagging operation, the operator may be able to choose the best method to control the packing density, which may include varying one or more of the components of the bagging machine, such as the material transport system 24, the material packing assembly 30, and the anchor assembly 38.

As described above, the anchor assembly 38 may include a length adjusting system, such as a rotatable winch, that is adapted to allow the extended length of the at least one drag member to be varied during the bagging operations. When the visual display 72 includes control elements 76 that allow the operator to communicate with and control the anchor assembly 38, the operator may be able to control the operation of the length adjustment system to increase or decrease the extended length of the at least one drag member 42, as necessary, to maintain the measured anchoring force within a predetermined anchoring force range. For example, if the material being packed changes from wet material to dry material, it may be necessary to extend the length of the at least one drag member to maintain the desired anchoring force corresponding to the desired packing density. Other changes in bagging conditions, such as the nature of the ground over which the machine is bagging the material or the nature of the material being bagged, may similarly affect the amount of anchoring force applied by the at least one drag member 42 of the anchor assembly 38. Accordingly, the operator may desire to increase or decrease the extended length of the at least one drag member for a variety of reasons. In bagging machines incorporating a force measurement system 54 and a drive assembly 62, the operator may be able to receive actual measurements of what is happening in the bagging operations and to control the amount of anchoring force applied by the anchor assembly to attain and/or maintain a desired packing density.

As seen in FIG. 1, bagging machines within the scope of the present disclosure may be adapted to provide controllers 76 of a variety of configurations to facilitate the control of the bagging machine, including the control of the anchor assembly 38. For example, levers, wheels, slide bars, foot pedals, or other suitable controllers may be used. Additionally or alternatively, the bagging machines may include one or more automation systems adapted to automatically control one or more components in response to one or more inputs. In one exemplary configuration of an automation system, an anchor control assembly may be operatively coupled to the anchor assembly 38 and to the force measurement system 54. The anchor control assembly may be adapted to monitor the anchoring force applied to the bagging machine and to enable control of the drive assembly 62 or other component of the anchor assembly to vary the extended length of at least one drag member to vary the anchoring force.

Continuing with the exemplary anchor control assembly, the anchor control assembly may monitor the anchoring force applied to the bagging machine in any suitable manner, such as by receiving an input from the output device 66. Additionally or alternatively, the anchor control assembly may interface with the components and circuits of the force measurement system 54 that communicate with the output device 66. The anchor control assembly may monitor the measured anchoring force, the measured deformation or change in the anchor assembly, or the correlated packing density. Regardless of which variable is monitored by the anchor control assembly, at least one input that can be correlated to the packing density of the bagging machine may be monitored by the anchor control assembly.

The anchor control assembly may have at least one output as well. The output from the anchor control assembly may be adapted to control the drive assembly 62 or other component of the anchor assembly 38 to thereby control the length of at least one drag member and the anchoring force applied thereby. The anchor control assembly may communicate with the anchor assembly 38 and the force measurement system 54 via any suitable communication interface, such as wired or wireless communication.

Additionally or alternatively, the anchor control assembly may receive data input from other components of the bagging machine, such as from the anchor assembly 38. The data monitored from the anchor assembly 38 may include the relative position of the winch 50 and/or the extended length of the drag member 42, such as may be determined from the number of times the winch is turned. Additionally or alternatively, the anchor control assembly may receive data from the material packing assembly 30 and/or the material transport system 24. Additionally, the anchor control assembly may receive inputs from the operator, such as characteristics of the material being bagged (wet, dry, long, short, type of material, etc.). The anchor control assembly, when included in bagging machines, is adapted to automatically control the configuration of the anchor assembly (i.e., the extended length of at least one drag member) and the anchor control assembly may be better able to finely tune the anchor assembly to maintain a desired packing density when the anchor control assembly is provided with an increased number of data inputs. However, anchor control assemblies within the scope of the present disclosure may receive only one data input, such as the measured anchoring force.

In some exemplary embodiments, the anchor control assembly may be adapted to automatically control the operation of the anchor assembly and, in some configurations, other components of the bagging machine to maintain the anchoring force within a predetermined range. For example, the operator may be able configure the anchor control assembly to operate in a particular packing mode, such as a corn packing mode, wherein the anchor control assembly is configured to monitor the anchoring force and control the anchor assembly to release or draw in the drag member to maintain the anchoring force within a predetermined range appropriate for packing corn.

Additionally or alternatively, the anchor control assembly and the output device 66 may cooperate and/or communicate to provide a cruise-control-like functionality to the bagging machine. For example, the output device 66 may inform the operator of the packing density within the bag as discussed above. The operator may then determine that a particular condition is preferred, such as a particular measured anchoring force. The operator may input the preferred or target condition to the anchor control assembly via one or more controls. In a preferred embodiment, the input may be as simple as a push button, such as the cruise-control function of a car. The anchor control assembly then sets the target condition as its set-point and monitors and controls conditions to stay within a predetermined range of the target conditions. For example, the operator may input a target anchoring force and the anchor control assembly may vary the length of at least one drag member 42 to maintain the anchoring force near the target anchoring force, which may be within a predetermined range in some configurations.

The anchor control assembly is representative of suitable automation systems that may be incorporated into bagging machines according to the present disclosure. As indicated above, the automation systems may receive inputs from the operator and from one or more components of the bagging machine and may provide outputs to control one or more components. Exemplary variations of a suitable automation system include systems that monitor the material feed rate at the material receiving assembly 22 and/or the material packing assembly 30 and vary the operation of the material packing assembly 30 and/or the anchor assembly 38 in response to changes in the material feed rate. Other automation systems are within the scope of the present disclosure.

Figure 6:
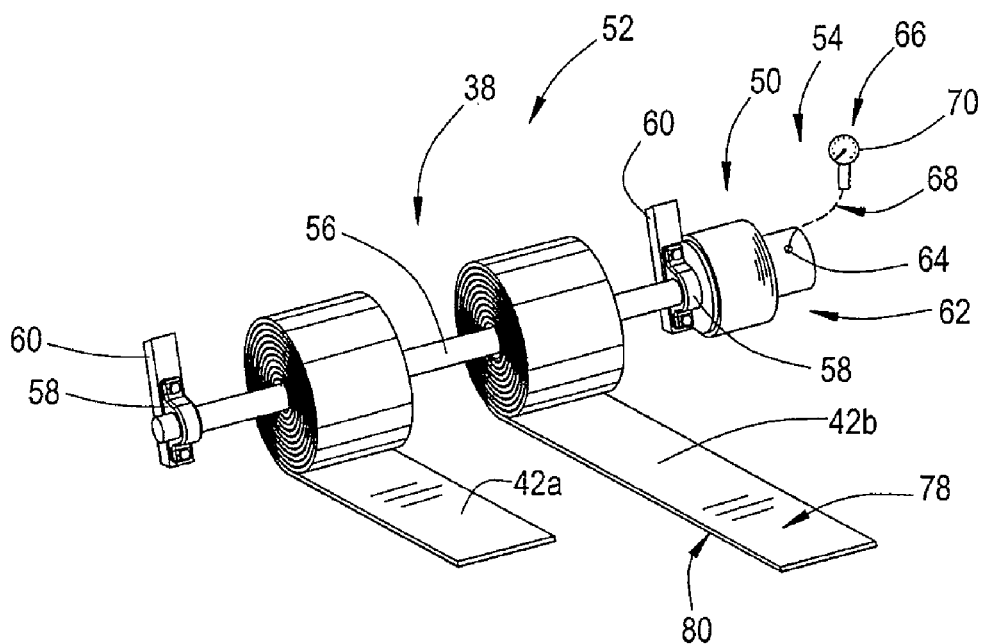
FIG. 6 is a rear perspective view of an alternative anchor assembly having a plurality of straps.

With reference now to FIG. 6, an alternative configuration of an anchor assembly 38 may comprise more than one drag member 42. Anchor assemblies according to some implementations of the present disclosure may include two drag straps 42a, 42b, as shown, and may include more than two straps. The plurality of drag straps 42a, 42b may be operatively coupled to the packing machine in any of the manners described above for drag member 42 or they may be coupled to rotatable shaft 56 of the winch assembly 50, as shown in FIG. 6. Anchor assemblies 38 having multiple drag members, or drag straps, may be adapted to operate in a manner similar to the operation of the anchor assembly 38 discussed above in relation to FIGS. 1-5.

Additionally, an anchor assembly 38 having a plurality of drag straps 42a, 42b may allow for greater control over the packing density. As discussed above, the density to which the material is packed in the bag is related to the amount of drag member surface area disposed between the packed material and the ground surface. Accordingly, the density may be adjusted by varying the width or the length of the drag member(s) disposed under the packed material. The packing machine 10 may be used to pack a variety of materials and different packing densities may be desired for different materials. Because of the different physical properties of the materials to be packed, the different desired densities, and the other variables that affect material packing quality, a user may prefer to be able to control both the length and the width of the drag member.

The drag straps 42a, 42b provide a user with the ability to control the width of the surface area under pressure by adding or removing straps rather than replacing the drag member 42 for a different drag member having a different width. Additionally, the use of a plurality of straps may allow the user to customize the anchor assembly 38 for use with bags of different diameters without requiring an assortment of differently sized drag members. For example, the movable frame 12 may be configured to carry four separately adjustable drag straps wherein the outermost drag straps are only extended for use with larger diameter bags or containers.

While FIG. 6 illustrates a plurality of drag straps used in connection with a winch shaft, it should be understood that each of the plurality of drag straps may be operatively coupled to the packing machine in any of the manners discussed above. Additionally, the plurality of drag straps may be configured to be separately adjustable. Continuing with the example of FIG. 6 where the drag straps are coupled to a winch shaft, each strap may operatively coupled to a corresponding rotatable shaft that is rotatable independent of the other rotatable shafts. When other adjustable devices are used to vary the extended length of the drag straps, a plurality of such devices may be provided to allow separate and independent adjustment of the drag straps. It should be understood that the anchor assembly 38 may be provided with any number of drag straps and any number of adjustment devices to control the extended length of the straps. Each winch 50 may be configured to control the length of one or more straps such that at least two of the drag straps are separately and selectively adjustable.

In operation, the separately adjustable drag straps 42a, 42b may enable the operator and/or the anchor control assembly to effect greater control over the packing density. Considering an exemplary anchor assembly having three drag straps, the anchor assembly 38 may be configured to allow control of the center drag strap separate from the control of the outer drag straps. In such a configuration, the anchor assembly may be able to wind up or unwind the center drag strap by a given distance, which would correspond to a change in the anchoring force of only one-third the change that would have occurred if the operator had adjusted all of the drag straps by the same distance. Accordingly, in circumstances where the adjustment device for varying the extended length of the drag strap is limited to incremental changes, the ability to control a fraction of the drag straps separate from the others may provide finer control over the applied anchoring force, such as by corresponding fractions of the increments available through the adjustment device alone.

Additionally or alternatively, the separately adjustable drag straps may be used to control the direction in which the bag or container is extended. In the typical packing or bagging operation, the packing machine moves away from the closed end of the bag in a substantially linear path driven primarily by the force of the material packing into the bag. This causes the bag to form a substantially straight line in the direction in which the movable frame is headed as the bag is being filled. Such a bag can be seen in FIGS. 4 and 5.

However, many users of the packing machines 10 do not have the space available to serve as an ideal packing and storage location. The ground available for packing and storage may not be long enough for the long straight bags or the ground may be uneven or have obstacles in the desired bag path. In such circumstances, it may be desirable to have the bag turn a corner if the storage area is shorter than the desired bag length or to have the bag detour around an obstacle. For these and other reasons it may be desirable to vary the direction in which the bag or container is laid down while the bagging operation is proceeding.

An anchor assembly having separately adjustable drag straps may facilitate the directional control of the bag while preserving packing density quality. Using an embodiment with two separately adjustable drag straps as an example, the bag may be caused to turn to the right by increasing the extended length of the drag strap on the right hand side of the anchor assembly 38. Increasing the extended length of the drag strap on the right hand side will lead to increased resistance to the packing machine's forward progress on the right hand side while maintaining substantially the same resistance on the left hand side. The increased resistance on the right hand side will cause the left hand side to advance more quickly than the right hand side, which causes the movable frame and the bag to turn to the right. The same principles allow a turn to the left by increasing the extended length of the drag strap on the left hand side of the anchor assembly 38.

The drag member 42 (and the flexible straps) has an upper surface 78 and a lower surface 80. The upper and lower surfaces of the drag member and the drag straps are discussed with reference to the drag member 42 but it is to be understood that the description applies to the drag straps as well. The upper surface 78 is disposed in facing relationship with the packed material. That is, the upper surface is the surface on which the packed material rests, either directly or with a bag or container disposed between the packed material and the drag member. Lower surface 80 of the drag member is disposed in facing relationship with the ground surface.

Figure 7:
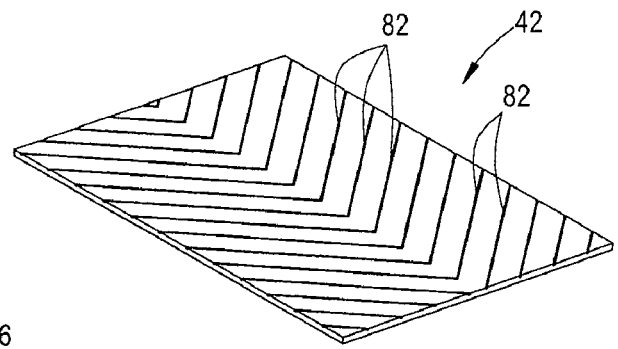
FIG. 7 is a perspective view of the upper surface of a drag member of an anchor assembly illustrating a plurality of protuberances disposed thereon.

Drag member 42 may be configured with a plurality of protuberances 82 disposed on upper surface 78, as shown in FIG. 7. The plurality of protuberances on upper surface 78 may be configured to guide the bag or container material as the packing machine moves forward. Whether configured with or without the protuberances, drag member 42 may increase the usable length of the container. The weight of the packed material pressing the bag or container material against the upper surface 78 of drag member 42 may pull the bag or container material so that it is stretched tight. Pulling the container material may reduce the wrinkles in the bag, which, if present, may reduce the effective length of the bag. Additionally, when upper surface 78 is configured with a pattern of protuberances, the protuberances 82 may be configured to facilitate or maintain the cylindrical or semi-cylindrical configuration of the flexible, elongate material forming the container, which may be used as an alternative to a conventional bag. As discussed above, a cylindrical or semi-cylindrical container may be formed by tucking opposing side edges of an elongate material under the packed material. Once a portion of the elongate material is disposed between the packed material and the drag member 42, protuberances 82, angled inwardly as shown in FIG. 7, may direct the opposing side edges inwardly to retain the cylindrical or semi-cylindrical configuration of the container.

The weight of the packed material on drag member 42 as the machine 10 moves forward may also smooth uneven ground beneath drag member 42. The unevenness of the ground may be caused by wheel tracks, farming operations, packing operations, etc. Positioning the bag on even ground results in better bagging for a variety of reasons such as improved control over the packing density and consistency. Additionally, having the bag positioned on even ground facilitates the removal of the packed material from the bag because wrinkles, folds, and other inconsistencies that conform to uneven ground will not be present in the bottom of the bag.

The lower surface 80 of drag member 42 may be configured with a plurality of protuberances, bumps, or ridges to further enhance the smoothing effect of drag member 42 passing over the ground surface. The plurality of protuberances disposed on lower surface 80 can be in any configuration or arrangement desired. The protuberances, when present, are effective to disrupt the existing ground surface so that the weight of drag member 42 can smooth the ground.

Figure 8:
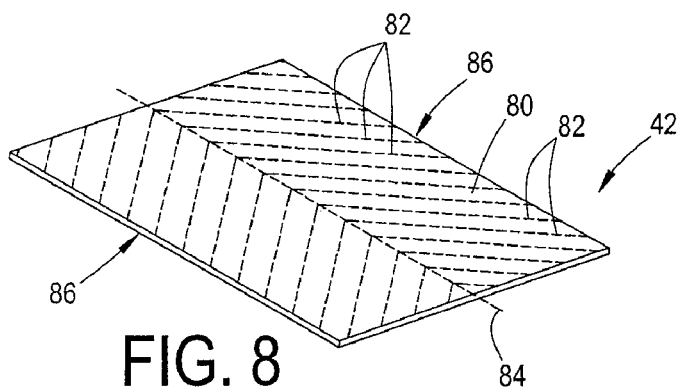
FIG. 8 is a perspective view of the lower surface of a drag member of an anchor assembly illustrating a plurality of protuberances disposed thereon.

One configuration of the plurality of protuberances 82 is shown in FIG. 8. The protuberances 82 may be configured to form a series of V-shaped patterns on the lower surface with the point of each V-shaped pattern being position along the longitudinal centerline 84 of drag member 42 and the arms of each V-shaped pattern extending rearwardly toward the opposing side edges 86 of drag member 42.

Figure 9:
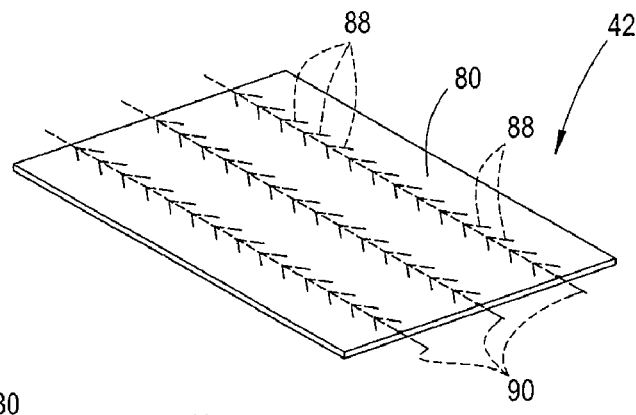
FIG. 9 is a perspective view of the lower surface of a drag member of an anchor assembly illustrating an alternative configuration of the plurality of protuberances.
Figure 10:
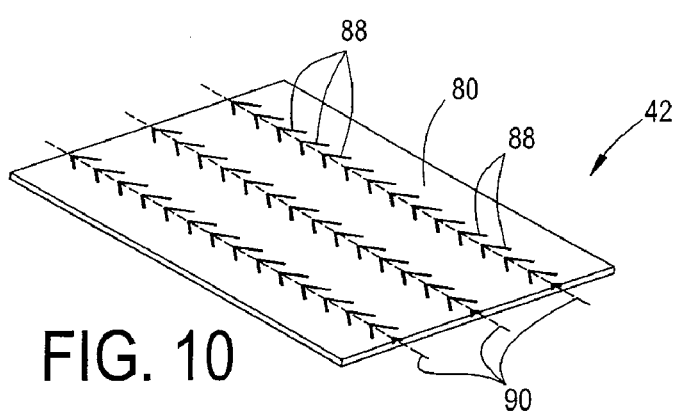
FIG. 10 is a perspective view of the lower surface of a drag member of an anchor assembly illustrating an alternative configuration of the plurality of protuberances.

An alternative configuration of the protuberances on the lower surface 80 of drag member 42 is shown in FIG. 9. In this configuration, the protuberances are arranged to form a plurality of smaller V-shaped patterns 88 aligned along a plurality of longitudinal lines 90. FIG. 10 is distinguished from FIG. 9 in that the smaller V-shaped patterns 88 are formed by a continuous ridge rather than a plurality of bumps or protuberances as in FIG. 9.

It is believed that the disclosure set forth above encompasses multiple distinct methods and/or apparatus with independent utility. While each of these methods and apparatus has been disclosed in its preferred form, the specific embodiments thereof as disclosed and illustrated herein are not to be considered in a limiting sense as numerous variations are possible. The subject matter of the disclosures includes all novel and non-obvious combinations and subcombinations of the various elements, features, functions and/or properties disclosed herein. The principles of the present disclosure may be embodied in other specific forms without departing from its structures, methods, or other essential characteristics as broadly described herein. The described embodiments are to be considered in all respects only as illustrative, and not restrictive. The scope of the disclosure is, therefore, not limited by the foregoing description or the following claims, and all changes that come within the meaning and range of equivalency of the foregoing description and/or the following claims are to be embraced within its scope. Similarly, where the description and/or the claims recite "a" or "a first" element or the equivalent thereof, such description should be understood to include incorporation of one or more such elements, neither requiring nor excluding two or more such elements.

It is believed that the following claims are directed to certain combinations and subcombinations that correspond to disclosed examples and that are believed to be novel and non-obvious. Other combinations and subcombinations of features, functions, elements and/or properties may be claimed through amendment of the present claims or presentation of new claims in this or a related application. Such amended or new claims, whether they are directed to a different combination or directed to the same combination, whether different, broader, narrower or equal in scope to the original claims, are also regarded as included within the subject matter of the present disclosure.

I claim:

1. A density control system for use in cooperation with a packing machine that is adapted to move forwardly with respect to a ground surface as the machine packs material into a container, the density control system comprising:

a material-forming enclosure having an intake end configured to couple to a packing machine and configured to receive material to be packed, and an output end extending rearwardly away from the packing machine and configured to receive a container; and at least one drag member including a first and a second drag strap operatively coupled to the packing machine and configured to extend rearwardly beneath at least a portion of the container to resist forward movement of the packing machine; wherein at least one of the first and second drag straps has at least an upper surface and a lower surface; wherein at least a portion of the upper surface is adapted to be disposed in frictional contact with at least one of a portion of the container and a portion of the packed material; and wherein the lower surface is adapted to be disposed in frictional contact with a ground surface.

2. The density control system of claim 1, wherein the first and second drag straps each have a fixed strap length and an adjustable extended length.

3. The density control system of claim 2, wherein at least one of the first and second drag straps is wound upon a selectively rotatable winch, and wherein the extended length of the at least one of the first and second drag straps is adjustably controlled by selective rotation of the winch.

4. The density control system of claim 1, wherein a plurality of protuberances are disposed on at least one of the lower surface and the upper surface of at least one of the first and second drag straps, and wherein the plurality of protuberances are adapted to modify the frictional contact of at least one of the first and second drag straps with at least one of the ground surface, the portion of the container, or the portion of the packed material.

5. The density control system of claim 4, wherein a plurality of protuberances are disposed on the upper surface of at least one of the first and second drag straps to guide opposing side edges of an elongate covering inwardly to tuck the opposing side edges under the packed material to form a container as the packing machine moves forward.

* * * * *